F. ROEDER.
TRANSFERRING DEVICE FOR SHIPS OR VESSELS.
APPLICATION FILED JAN. 16, 1907.
954,135.
Patented Apr. 5, 1910.
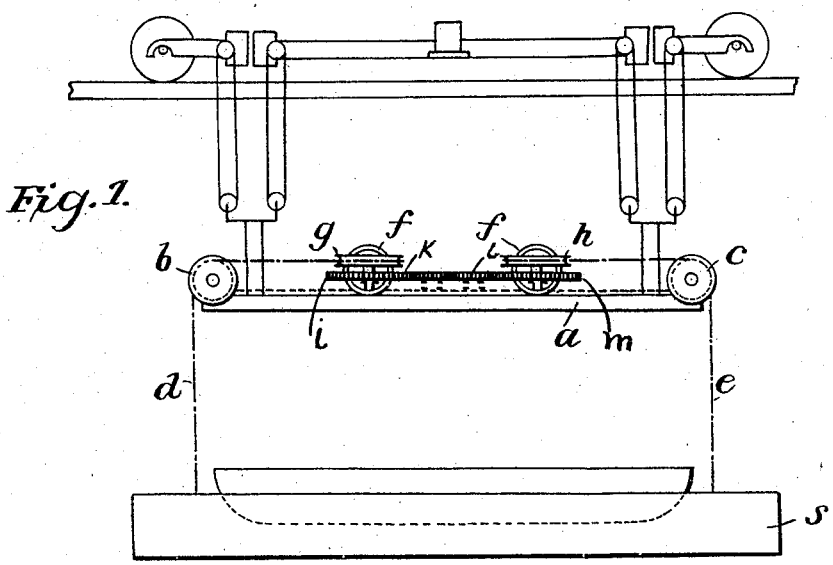
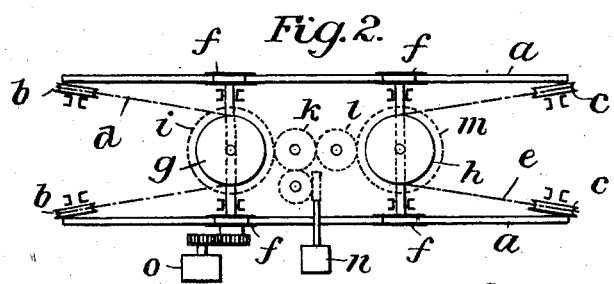
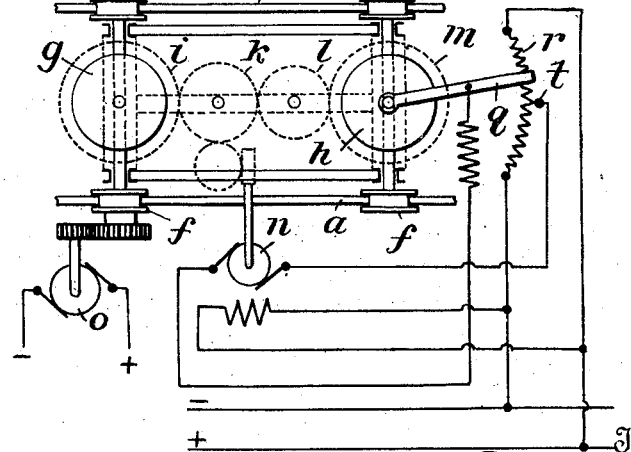

UNITED STATES PATENT OFFICE.

FRANZ ROEDER, OF WIESBADEN, GERMANY.

TRANSFERRING DEVICE FOR SHIPS OR VESSELS.

954,135.  Specification of Letters Patent.  Patented Apr. 5, 1910.

Application filed January 16, 1907. Serial No. 352,658.

*To all whom it may concern:*

Be it known that I, FRANZ ROEDER, a subject of the German Emperor, and a resident of Wiesbaden, Germany, have invented certain new and useful Improvements in Transferring Devices for Ships or Vessels, of which the following is a specification.

In ship lifting devices of the character disclosed in patent issued to me April 16, 1907, No. 850,320, it is of great importance that the sluice chamber be maintained in a perfectly horizontal position.

The object of the present invention is to provide such an apparatus as is generally disclosed in the patent referred to with means for maintaining the sluice chamber and the load supported thereby in horizontal position while connected with the lifting and transfer devices. For this purpose means are provided whereby if the load support moves from horizontal position about a longitudinal axis, a member will be turned about a vertical axis and if the load support moves from horizontal position about a transverse axis, said member will be bodily adjusted and with such adjustable member are combined devices for automatically restoring it and the sluice chamber or load support to normal position when said member is adjusted, as above described.

In the accompanying drawing, Figure 1 is a side elevation of an embodiment of the invention; Fig. 2 is a plan view; Fig. 3 is a diagrammatic view illustrating one form of electrical controlling mechanism.

Referring to the drawings, $s$ designates the sluice chamber or load support, of the character described in the patent hereinbefore referred to. Said sluice chamber is suitably connected with adjustable means supported by a track comprising parallel rails $a$ which are carried by suitable elevating means, such for example as the ropes or chains represented in said patent and shown in Fig. 1.

As shown two cables $d$, $e$, are attached at their lower ends to the sluice chamber and passing over guide pulleys $b$, $c$, supported by the track $a$ are connected respectively with pulleys $g$ $h$ mounted to rotate about vertical axes on a truck having carrying wheels $f$ engaging the rails of the track, the track being provided with toothed bars. The pulleys $g$, $h$, are respectively connected with gears $i$, $m$, which engage with intermeshing pinions $k$, $l$, whereby said pulleys are so connected that movement of either is transmitted to the other and that they rotate together but in opposite directions.

An electric motor $n$ is geared to pinion $k$ and it will be seen that if said motor is actuated the pulleys $g$, $h$, will be turned and through the cables $d$, $e$, will adjust the sluice chamber about a longitudinal axis. A second motor $o$ is geared to one of the axles of the aforesaid truck and thereby the truck may be moved longitudinally of the track to adjust the sluice chamber about a transverse axis. By means of the motors $n$, $o$, the pulleys $g$, $h$, may be rotated and the truck bodily moved on the track to bring the sluice chamber into perfectly horizontal position and by providing one of said pulleys and the truck with means whereby said motors will be automatically started if said pulley or truck is shifted from the positions assumed when the sluice chamber is horizontal, said chamber can be maintained in the desired position throughout the operation of transferring a vessel from one body of water to another, as explained in Patent No. 850,320. That is, the truck may be provided with suitable means whereby when the latter is shifted in either direction from its normal position the motor $o$ will be energized and caused through the gearing connecting it with the truck to return the latter to its normal position, or one of the pulleys $g$, $h$, may be provided with means whereby when said pulley is rotated, owing to a rocking of the sluice chamber from horizontal position, the motor $n$ will be energized and through the gearing connecting it with the pulleys $g$, $h$, the latter will be restored to normal position in which the sluice chamber is held perfectly horizontal. Such a means is diagrammatically illustrated in Fig. 3 in which a switch arm $q$ is connected with the pulley $h$. When the sluice chamber is in a horizontal position the arm $q$ will rest on a contact $t$ arranged central of a resistance $r$ in a circuit controlling the motor $n$. With the parts in this position the motor $n$ will be idle but if the arm $q$ is, through turning of the pulley $h$ due to a rocking of the sluice chamber, moved into the position shown in Fig. 3, the motor will be instantly started and caused to return the parts to their normal position.

Having described the invention what is claimed is,

1. In a ship lifting apparatus, the combination of a support for the vessel to be lifted, and elevating devices connected with said support and including a movable member, means for shifting said member in one direction when the support moves from horizontal position about a longitudinal axis and means for shifting said member in another direction when the support moves about a transverse axis.

2. In a ship lifting apparatus, the combination of a support for the vessel to be lifted, and elevating devices connected with said support and including a movable member, means for rotating said member when the support moves from horizontal position about a longitudinal axis and means for bodily shifting the member when the support moves from horizontal position about a transverse axis.

3. In a ship lifting apparatus, the combination of a sluice chamber, and elevating devices connected with said chamber and comprising a track, a truck mounted on the track, two cables each extending about a pulley mounted on the truck and having its ends attached to the sluice chamber, and gearing connecting the pulleys on the truck.

4. In a ship lifting apparatus, the combination of a sluice chamber, elevating devices including a track, a truck mounted on the track, cables connecting the sluice chamber with devices mounted on and adapted to be adjusted relative to the truck, means for adjusting said devices to rock the sluice chamber about a longitudinal axis, and means for adjusting the truck on the track to rock the sluice chamber about a transverse axis.

5. In a ship lifting apparatus, the combination of a sluice chamber, elevating means connected with said chamber, and means constructed to move said chamber about one axis.

6. In a ship lifting apparatus, the combination of a sluice chamber, elevating means connected with said chamber, and means constructed to move said chamber about axes at right angles to each other.

7. In a ship lifting apparatus, the combination of a sluice chamber, elevating means connected with said chamber, and means constructed to move said chamber automatically about one axis so as to maintain said chamber level.

8. In a ship lifting apparatus, the combination of a sluice chamber, elevating means connected with said chamber, and means constructed to move said chamber automatically about axes at right angles to each other so as to maintain said chamber level.

9. In a ship lifting apparatus, the combination of a support for the vessel to be lifted, elevating devices including a horizontal track, a truck mounted on said track, two pulleys mounted on the truck to turn about vertical axes, a cable extending about each pulley and having its ends attached to said support, and gearing connecting said pulleys, whereby any movement of the support from a horizontal position will turn the pulleys or move the truck on the track, and means for automatically restoring to normal position the parts thus shifted.

In testimony whereof I have signed my name to this specification in the presence of two subscribing witnesses.

FRANZ ROEDER.

Witnesses:
ERWIN DIPPEL,
CARL GRUND.